(12) United States Patent
Park et al.

(10) Patent No.: US 8,587,671 B2
(45) Date of Patent: Nov. 19, 2013

(54) DIGITAL IMAGE PROCESSING APPARATUS, AN IMAGE PROCESSING METHOD, AND A RECORDING MEDIUM STORING THE IMAGE PROCESSING METHOD FOR OBTAINING AN OUT-OF-FOCUS IMAGE BY USING A PLURALITY OF IMAGES

(75) Inventors: Jeong-yong Park, Masan-si (KR); Soon-geun Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 12/874,341

(22) Filed: Sep. 2, 2010

(65) Prior Publication Data
US 2011/0187900 A1   Aug. 4, 2011

(30) Foreign Application Priority Data
Feb. 1, 2010   (KR) .......................... 10-2010-0009162

(51) Int. Cl.
*H04N 5/228* (2006.01)
*H04N 5/262* (2006.01)

(52) U.S. Cl.
USPC ........ 348/208.1; 348/239; 348/345; 382/284; 382/266

(58) Field of Classification Search
USPC ............ 348/208.1, 239, E05.058, 345, 222.1, 348/229.1, E13.039
See application file for complete search history.

(56) References Cited

U.S. PATENT DOCUMENTS

| | | | | |
|---|---|---|---|---|
| 5,511,155 | A * | 4/1996 | Yamaguchi | 345/643 |
| 2002/0135688 | A1* | 9/2002 | Niikawa | 348/251 |
| 2002/0191100 | A1* | 12/2002 | Matsunaga et al. | 348/345 |
| 2005/0128323 | A1* | 6/2005 | Choi | 348/239 |
| 2008/0106615 | A1* | 5/2008 | Ahonen et al. | 348/231.99 |
| 2008/0117316 | A1* | 5/2008 | Orimoto | 348/240.3 |
| 2008/0259176 | A1* | 10/2008 | Tamaru | 348/222.1 |
| 2009/0040321 | A1* | 2/2009 | Nakamura | 348/208.11 |
| 2009/0096896 | A1* | 4/2009 | Imafuji et al. | 348/234 |
| 2010/0128163 | A1* | 5/2010 | Nagasaka et al. | 348/348 |
| 2010/0238355 | A1* | 9/2010 | Blume | 348/607 |

FOREIGN PATENT DOCUMENTS

| | | |
|---|---|---|
| JP | 2003-283902 A | 10/2003 |
| JP | 2005-175956 A | 6/2005 |
| JP | 2008-245033 A | 10/2008 |

* cited by examiner

*Primary Examiner* — Hung Lam
(74) *Attorney, Agent, or Firm* — Drinker Biddle & Reath LLP

(57) ABSTRACT

A digital image processing apparatus performs an image processing method which includes capturing a first image, a second image, and a third image, which are captured with different focuses for the same subject and background; setting a subject portion and a background portion by using the first and second images; and combining the first image for the subject portion and the third image for the background portion with each other to obtain an out-of-focus image.

22 Claims, 12 Drawing Sheets

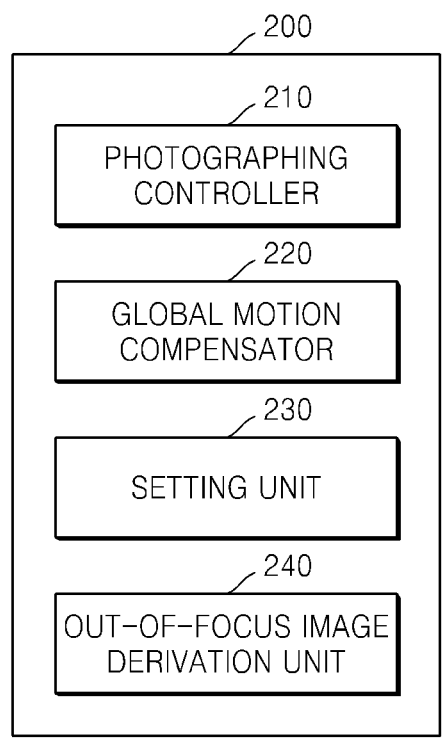

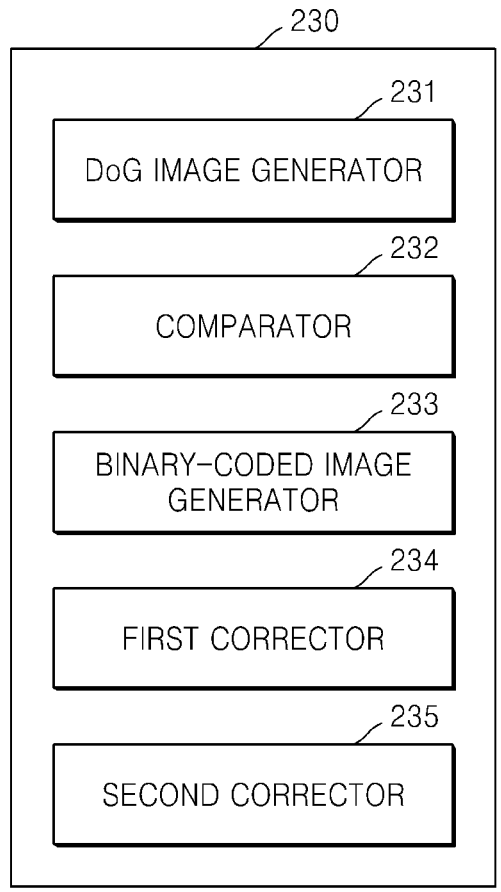
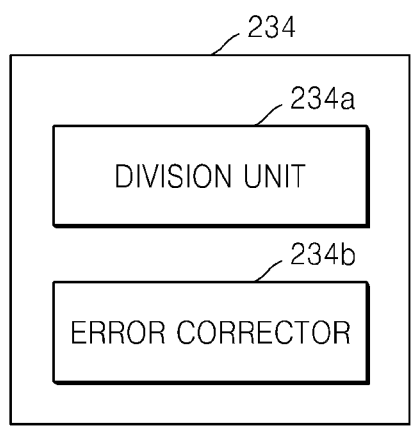

FIG. 8
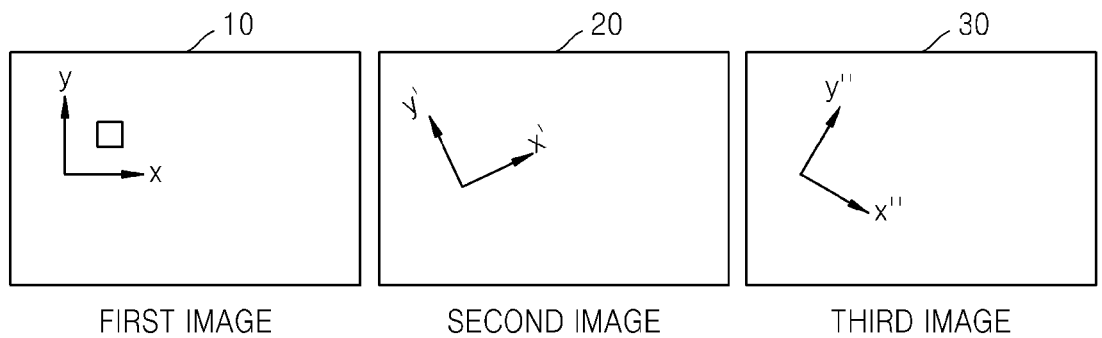
FIRST IMAGE    SECOND IMAGE    THIRD IMAGE
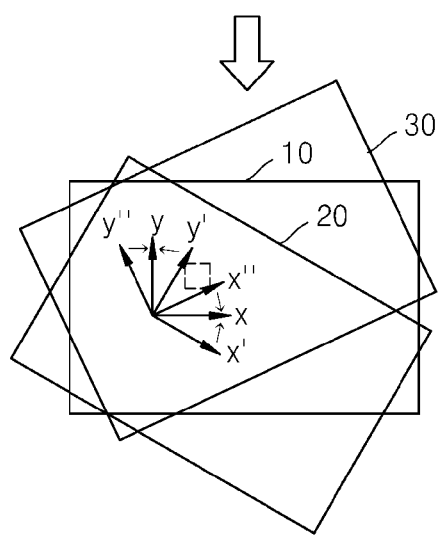

FIRST DoG IMAGE     SECOND DoG IMAGE

FIRST DoG IMAGE     SECOND DoG IMAGE

BINARY-CODED IMAGE

BINARY-CODED IMAGE

BINARY-CODED IMAGE

BINARY-CODED IMAGE

FIG. 14
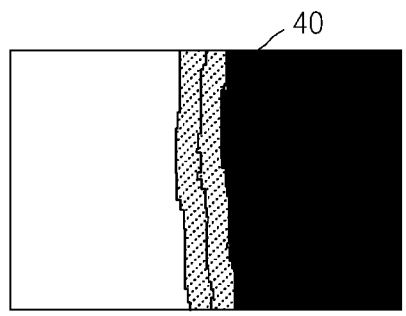
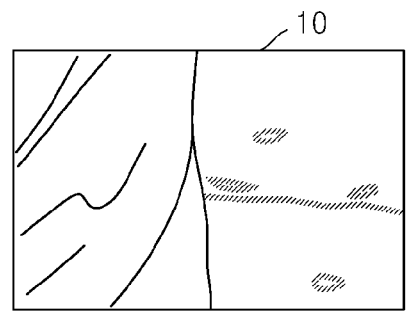
BINARY-CODED IMAGE  FIRST IMAGE
× ¼  × ¼
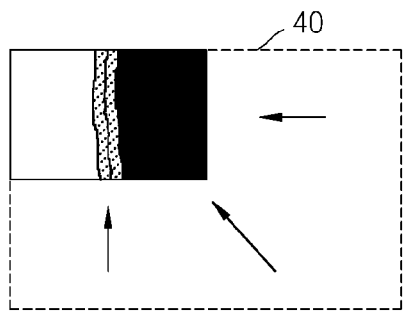
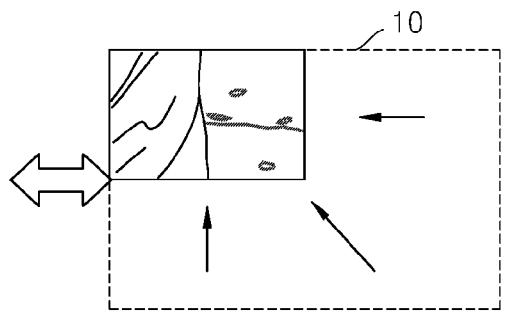

DIGITAL IMAGE PROCESSING APPARATUS, AN IMAGE PROCESSING METHOD, AND A RECORDING MEDIUM STORING THE IMAGE PROCESSING METHOD FOR OBTAINING AN OUT-OF-FOCUS IMAGE BY USING A PLURALITY OF IMAGES

CROSS-REFERENCE TO RELATED PATENT APPLICATION

This application claims the priority benefit of Korean Patent Application No. 10-2010-0009162, filed on Feb. 1, 2010, in the Korean Intellectual Property Office, the disclosure of which is incorporated herein in its entirety by reference.

BACKGROUND

1. Field of the Invention

Embodiments relate to a digital image processing apparatus, an image processing method, and a storage medium storing the image processing method for obtaining out-of-focus images.

2. Description of the Related Art

A user may want to obtain out-of-focus images, that is images in which only a subject is focused with a blurred background (e.g., images having a shallow depth of field), when taking pictures by using a digital camera. In general, out-of-focus images may be easily taken by using a digital single lens reflex (DSLR) camera. However, since an imaging area of a compact digital camera is narrow due to small and slim characteristics of the compact digital camera, a focal distance of a lens becomes short and a depth of field (DOF) becomes deep with respect to most of a background, and thus, it is difficult to obtain out-of-focus images.

SUMMARY

Embodiments include a digital image processing apparatus for obtaining out-of-focus images by using a plurality of images, an image processing method, and a recording medium storing the method.

According to an embodiment, an image processing method for obtaining an out-of-focus image by using a plurality of images includes: capturing a first image, a second image, and a third image, which are captured with different focuses for the same subject and background; setting a subject portion and a background portion by using the first and second images; and combining the first image for the subject portion and the third image for the background portion with each other to obtain an out-of-focus image.

The first image may be an image in which the subject is focused, the second image may be an image in which the background is focused, and the third image may be a super-macro image that is not focused.

The first image, the second image, and the third image may be captured successively when a single photographing start signal is input.

The method may further include: compensating for global motions of the second image and the third image based on the first image, after capturing the first, second, and third images.

The setting of the subject portion and the background portion by using the first and second images may include: generating a first difference of Gaussian (DoG) image and a second DoG image by applying a DoG filter to each of the first and second images; comparing radio frequency components in mask regions of the first and second DoG images with each other, wherein the mask regions respectively include reference pixels that are located at corresponding positions of the first and second DoG images; generating a single binary-coded image by representing the reference pixels as a first brightness value when the radio frequency component of the first DoG image is greater than that of the second DoG image, and representing the reference pixels as a second brightness value when the radio frequency component of the second DoG image is greater than that of the first DoG image; and correcting error pixels included in the generated binary-coded image.

Pixels represented as the first brightness value may be designated in the subject portion and pixels represented as the second brightness value may be designated in the background portion, and the method may further include correcting a boundary between the subject portion and the background portion in the binary-coded image.

Correcting the error pixels may include: dividing the binary-coded image into a plurality of blocks; and when there are more pixels of the first brightness value than pixels of the second brightness value in a block, converting the brightness value of the pixels of the second brightness value into the first brightness value, and when there are more pixels of the second brightness value than pixels of the first brightness value in the block, converting the brightness value of the pixels of the first brightness value into the second brightness value.

Correcting the boundary between the subject portion and the background portion may include: designating the boundary between the subject and the background and a peripheral portion as an unknown region; and reducing the unknown region by comparing the binary-coded image with the first image, and clarifying the boundary.

Reducing the unknown region may include: reducing the binary-coded image and the first image at a same reduction ratio; determining whether a pixel included in the unknown region corresponds to the subject portion or the background portion by using image information of the pixel included in the first image at the corresponding position to the pixel of the unknown region; and converting the pixel in the unknown region into the first brightness value when the pixel corresponds to the subject portion, and converting the pixel in the unknown region into the second brightness value when the pixel corresponds to the background portion, as a result of determination.

The image information may be a brightness value of a pixel or color information of a pixel.

Combining the first image for the subject portion and the third image for the background portion may include: substituting each pixel of the subject portion of the binary-coded image with a pixel of the first image at the corresponding position; and substituting each pixel of the background portion of the binary-coded image with a pixel of the third image at the corresponding position.

The boundary between the subject portion and the background portion may be alpha-blended.

According to another embodiment, a non-transitory computer readable storage medium may have stored thereon a program executable by a processor for performing the above image processing method for obtaining an out-of-focus image by using a plurality of images.

According to another embodiment, an image processing apparatus which obtains an out-of-focus image by using a plurality of images includes: a photographing controller that controls the apparatus to capture a first image, a second image, and a third image, which are captured with different focuses for the same subject and background; a setting unit that sets a subject portion and a background portion by using the first and second images; and an out-of-focus image derivation unit that combines the first image for the subject and the third image for the background to generate the out-of-focus image.

The first image may be an image in which the subject is focused, the second image may be an image in which the background is focused, and the third image may be a super-macro image that is not focused, and the first image may be captured before the second image and the third image.

The photographing controller may control the apparatus to capture the first image, the second image, and the third image successively when a single photographing start signal is received.

The apparatus may further include a global motion compensator that compensates for global motion of the second and third images based on the first image.

The setting unit may include: a DoG image generator that generates a first DoG image and a second DoG image by applying a DoG filter to each of the first and second images; a comparator that compares radio frequency components in mask regions of the first and second DoG images, which respectively include reference pixels that are located at positions corresponding to each other; a binary-coded image generator that generates a single binary-coded image by representing the reference pixels as a first brightness value when the radio frequency component of the first DoG image is greater than that of the second DoG image, and representing the reference pixels as a second brightness value when the radio frequency component of the second DoG image is greater than that of the first DoG image; and a first corrector that corrects error pixels included in the binary-coded image.

A pixel represented as the first brightness value may be designated in the subject portion and a pixel represented as the second brightness value may be designated in the background portion, and the apparatus may further include a second corrector that corrects a boundary between the subject portion and the background portion in the binary-coded image.

The first corrector may include: a division unit that divides the binary-coded image into a plurality of blocks; and an error corrector that, for each of the plurality of blocks, converts the brightness value of the pixels of the second brightness value into the first brightness value when there are more pixels of the first brightness value than pixels of the second brightness value in the block, and that converts the brightness value of the pixels of the first brightness value into the second brightness value when there are more pixels of the second brightness value than pixels of the first brightness value in the block.

The second corrector may include: an unknown region setting unit that designates the boundary between the subject and the background and a peripheral portion as an unknown region; and a boundary corrector that reduces the unknown region by comparing the binary-coded image with the first image, and clarifies the boundary.

The boundary corrector may include: an image reduction unit that reduces the binary-coded image and the first image by a same reduction ratio; a determiner that determines whether a pixel included in the unknown region corresponds to the subject portion or the background portion by using image information of the pixel included in the first image at the corresponding position to the pixel of the unknown region; and a converter that, for each pixel in the unknown region, converts the pixel into the first brightness value when the pixel corresponds to the subject portion, and converts the pixel into the second brightness value when the pixel corresponds to the background portion, as a result of the determining.

The image information may be the brightness value of the pixel or color information of the pixel.

The out-of-focus image derivation unit may substitute each pixel of the subject portion of the binary-coded image with a pixel of the first image at the corresponding position, and may substitute each pixel of the background portion of the binary-coded image with a pixel of the third image at the corresponding position.

The out-of-focus image derivation unit may perform an alpha-blending process on the boundary between the subject portion and the background portion.

BRIEF DESCRIPTION OF THE DRAWINGS

The above and other features and advantages will become more apparent by describing in detail exemplary embodiments with reference to the attached drawings in which:

FIG. 2 is a detailed block diagram illustrating a digital signal processor according to an embodiment;

FIG. 3 is a detailed block diagram of a setting unit included in the digital signal processor shown in FIG. 2;

FIG. 4 is a detailed block diagram of a first corrector included in the setting unit shown in FIG. 3;

FIG. 8 illustrates a process of compensating for the global motion of an image according to an embodiment;

FIG. 14 illustrates a process of reducing the unknown region of FIG. 13 and clarifying a boundary between the subject and the background, according to an embodiment;

DETAILED DESCRIPTION

Figure 1:
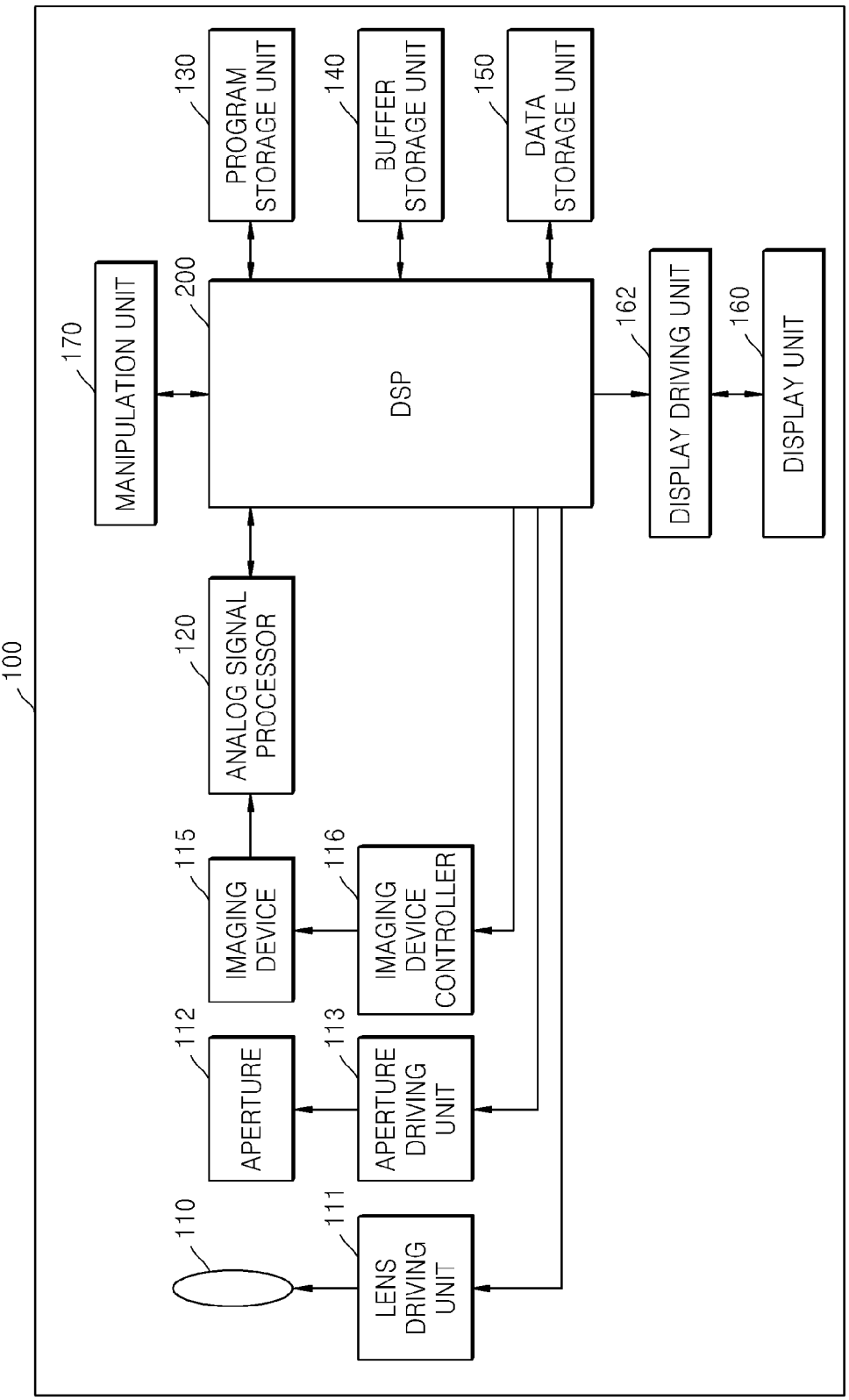
FIG. 1 is a block diagram illustrating a construction of a digital image processing apparatus according to an embodiment.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the written description, certain detailed explanations of related art are omitted when it is deemed that they may unnecessarily obscure the essence of the invention.

Connecting lines, or connectors shown in the various figures presented, are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

While such terms as "first," "second," etc., may be used to describe various components, such components must not be limited to the above terms. The above terms are used only to distinguish one component from another. The terms used in the specification are merely used to describe particular embodiments, and are not intended to limit the invention. An expression used in the singular encompasses the expression of the plural, unless it has a clearly different meaning in the context. In the specification, it is to be understood that terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. The words "mechanism" and "element" are used broadly and are not limited to mechanical or physical embodiments, but can include software routines in conjunction with processors, etc.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like.

Embodiments will be described below in more detail with reference to the accompanying drawings. Those components that are the same or are in correspondence are rendered the same reference numeral regardless of the figure number, and redundant explanations are omitted.

FIG. 1 is a block diagram illustrating a construction of a digital image processing apparatus according to an embodiment.

As an example of the digital image processing apparatus, a digital camera 100 will be described. However, the digital image processing apparatus is not limited to the digital camera 100 shown in FIG. 1, and the invention may be applied to digital appliances such as camera phones or personal digital assistants (PDAs).

The digital camera 100 includes a lens unit 110, a lens driving unit 111, an aperture 112, an aperture driving unit 113, an imaging device 115, an imaging device controller 116, an analog signal processor 120, a program storage unit 130, a buffer storage unit 140, a data storage unit 150, a display driving unit 162, a display unit 160, a digital signal processor 200, and a manipulation unit 170. Here, the lens unit 110, the lens driving unit 111, the aperture 112, the aperture driving unit 113, the imaging device 115, the imaging device controller 116, and the analog signal processor 120 may be referred to collectively as a photographing unit.

The lens unit 110 may include a zoom lens that controls a viewing angle to be reduced or increased according to a focal length, and a focusing lens that focuses onto a subject. These lenses may be formed of a respective single lens or a group of a plurality of lenses.

The aperture 112 opens or closes according to a driving signal from the aperture driving unit 113 in order to adjust intensity of incident light.

The lens driving unit 111 and the aperture driving unit 113 respectively receive a control signal from the digital signal processor 200 to drive the lens unit 110 and the aperture 112. The lens driving unit 111 adjusts the focal length by adjusting a location of the focusing lens, and performs operations such as auto-focusing (AF), zooming, and focus changing. The aperture driving unit 113 adjusts the opening/closing degree of the aperture 112, and in particular, adjusts an f-number (aperture value) in order to perform operations such as the AF, automatic exposure correction, focus changing, and depth of field (DOF) changing.

An optical signal passing through the lens unit 110 forms an image of a subject on a light receiving surface of the imaging device 115. A charge coupled device (CCD), a complementary metal oxide semiconductor image sensor (CIS), or a high speed image sensor may be used as the imaging device 115. A sensitivity of the imaging device 115 may be adjusted by the imaging device controller 116. The imaging device controller 116 may control the imaging device 115 according to a control signal that is generated automatically, by using an image signal input in real-time or a control signal manually input by a user of the digital camera 100.

Exposure time of the imaging device 115 is controlled by a shutter (not shown). The shutter may be a mechanical shutter that controls incidence of light by moving a cover, or an electronic shutter that controls exposure by supplying electric signals to the imaging device 115.

The analog signal processor 120 performs operations such as a noise reduction process, gain adjustment, waveform shaping, and analog-digital conversion with respect to the analog signals supplied from the imaging device 115.

Control signals from outside, for example, from the user, may be input through the manipulation unit 170. The manipulation unit 170 may include a shutter-release button for inputting a shutter-release signal that exposes the imaging device 115 to the light to capture images, a power button for inputting a control signal for turning on/turning off the digital camera 100, a wide-angle zoom button and a telephoto-zoom button for increasing and reducing a viewing angle according to input, and various functional buttons for inputting characters, selecting mode such as a photographing mode or a reproducing mode, setting white balance, and selecting exposure settings. The manipulation unit 170 having various buttons is not limited thereto, and may be embodied by any means enabling a user to input data, for example, a keyboard, a touch pad, a touch screen, or a remote controller.

In addition, the digital camera 100 includes the program storage unit 130 that stores programs such as an operating system for driving the digital camera 100 and application systems, the buffer storage unit 140 for temporarily storing data required to perform calculations or result data, and the data storage unit 150 that stores image files including image signals and various information required by the above programs.

In addition, the digital camera 100 includes the display unit 160 that displays an operation status of the digital camera 100 and information of images captured by the digital camera 100. The display unit 160 may provide the user with visual and aural information. The display unit 160 may be formed of a liquid crystal display (LCD) panel or an organic light emitting display (OLED) panel in order to provide visual information. The display driving unit 162 provides the display unit 160 with a driving signal.

In addition, the digital camera 100 includes the digital signal processor (DSP) 200 that processes input image signals and controls components in the digital camera 100 according to the input image signals or external input signals. The DSP 200 may perform, on the image data, an image signal process such as gamma correction, color filter array interpolation, color matrix processing, color correction, and color enhancement. In addition, the DSP 200 may generate an image file by compressing the image data generated by performing an image signal process for improving image quality, or restore image data from the image file. The image data may be compressed in a reciprocal or non-reciprocal format. As an example of the compression format, the image data can be converted into Joint Photographing Experts Group (JPEG) format or JPEG 2000 format. The compressed image data may be stored in the data storage unit 150. In addition, the DSP 200 may perform a coloring process, a blurring process, edge emphasizing, image analysis, image recognition, and image effect process. The image recognition process may include a face recognition process or a scene recognition process. The DSP 200 may perform, for example, brightness level adjustment, color correction, contrast adjustment, image division, generation of character images, and an image combining process.

In addition, the DSP 200 may generate a control signal for controlling the AF, the zoom changing, the focus changing, and the auto-exposure correction by executing a program stored in the program storage unit 130 or by adopting an additional module, and provides the generated control signal to the lens driving unit 111, the aperture driving unit 113, and the imaging device controller 116. In addition, the DSP 200 may perform overall control of operations of the components included in the digital camera 100, for example, the shutter or a flash.

FIG. 2 is a detailed block diagram illustrating the DSP 200 according to an embodiment.

Referring to FIG. 2, the DSP 200 includes a photographing controller 210, a global motion compensator 220, a setting unit 230, and an out-of-focus image derivation unit 240.

The photographing controller 210 receives a single photographing start signal, and may control the lens driving unit 111 and the aperture driving unit 113 so as to obtain a plurality of images with different focuses from each other with respect to the same subject and background. The plurality of images may include an image in which the subject is focused (hereinafter, a first image) 10, an image in which the background is focused (hereinafter, a second image) 20, and a super-macro image which is not focused (hereinafter, a third image) 30 (see FIG. 7). The photographing controller 210 may obtain the first through third images 10, 20, and 30 successively according to the single photographing start signal. Here, the first image 10 may be initially obtained. On the other hand, the embodiments may be applied to a digital image processing apparatus including a plurality of photographing units. In the digital image processing apparatus including the plurality of photographing units, for example, the first photographing unit and the second photographing unit, the photographing controller 210 may control the photographing units to obtain two of the first through third images 10, 20, and 30, or the three images simultaneously. For example, the photographing controller 210 may control a first photographing unit to obtain the first image 10 and at the same time, control a second photographing unit to obtain the second image 20. Here, the third image 30 may be obtained by the first photographing unit or the second photographing unit according to a selection of the user or an algorithm. In this case, a time for obtaining the plurality of images may be reduced, and the effect of a hand shake that may occur while obtaining the images may be minimized.

The global motion compensator 220 compensates for global motions of the second image 20 and the third image 30 respectively, based on the first image 10. The term "global motion" denotes shifting of all of the pixels due to dislocation of the digital camera 100 during photographing the second and third images 20 and 30 after photographing the first image 10. The global motion compensation compensates for the shift of all the pixels to align the first through third images 10-30 to correspond to each other (see FIG. 8).

The setting unit 230 sets a subject portion and a background portion by using the first and second images 10 and 20 among the plurality of images to obtain a binary-coded image.

The out-of-focus image derivation unit 240 combines the subject portion of the first image 10, in which the subject image is focused, with the subject portion of the binary-coded image, and combines the background portion of the third image 30, that is, the super-macro image, with the background portion of the binary-coded image to derive an out-of-focus image.

The setting unit 230 and the out-of-focus image derivation unit 240 will be described in more detail later.

FIG. 3 is a detailed block diagram of the setting unit 230 included in the DSP 200 shown in FIG. 2.

Referring to FIG. 3, the setting unit 230 includes a difference of Gaussian (DoG) image generator 231, a comparator 232, a binary-coded image generator 233, a first corrector 234, and a second corrector 235.

Figure 9:
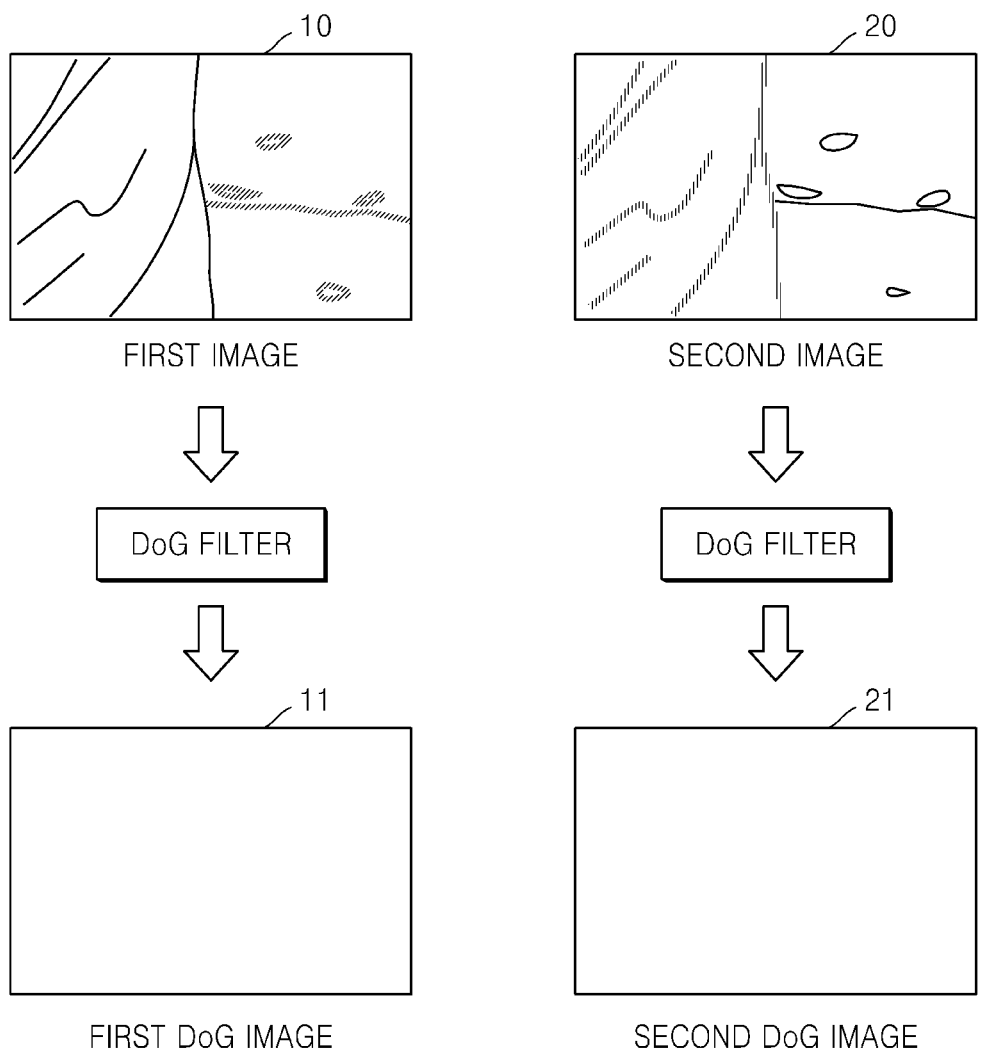
FIG. 9 illustrates processes of applying a difference of Gaussian (DoG) filter to images and obtaining results, according to an embodiment.

The DoG image generator 231 applies a DoG filter to each of the first and second images 10 and 20 to generate a first DoG image 11 and the second DoG image 21 (see FIG. 9). The DoG filter is a filter showing a difference between two Gaussian filters having different sigma ($\sigma$) values. This may be represented by the following Equations 1 through 3. Equation 1 denotes a first Gaussian filter having a first sigma value ($\sigma_1$), and Equation 2 denotes a second Gaussian filter having a second sigma value ($\sigma_2$). Here, the second sigma value $\sigma_2$ is greater than the first sigma value $\sigma_1$. When the first sigma value $\sigma_1$ is greater than the second sigma value $\sigma_2$, radio frequency components may not be obtained in the DoG image. The DoG filter represents a difference between the first Gaussian filter and the second Gaussian filter as shown in Equation 3. Here, in Equations 1 through 3, x and y denote a coordinate of a pixel, and the first sigma value $\sigma_1$ and the second sigma value $\sigma_2$ is a standard deviation representing a degree of smoothing of the Gaussian filter.

$$G_1 = \frac{1}{2\pi\sigma_1^2} e^{\frac{-(x^2+y^2)}{2\pi\sigma_1^2}} \quad (1)$$

$$G_2 = \frac{1}{2\pi\sigma_2^2} e^{\frac{-(x^2+y^2)}{2\pi\sigma_2^2}} \quad (2)$$

$$DoG(x, y) = G_1(x, y) - G_2(x, y)$$

$$= \left[\frac{1}{2\pi\sigma_1^2} e^{\frac{-(x^2+y^2)}{2\pi\sigma_1^2}}\right] - \left[\frac{1}{2\pi\sigma_2^2} e^{\frac{-(x^2+y^2)}{2\pi\sigma_2^2}}\right]$$

The first DoG image 11 and the second DoG image 21 generated by the DoG image generator 231, respectively, represent radio frequency components of the first and second images 10 and 20. Therefore, clarities of the first image 10 and the second image 20 may be compared by comparing magnitudes of the radio frequency components in the first and second DoG images 11 and 21.

The comparator 232 compares magnitudes of the radio frequency components in mask regions, which include reference pixels that are located at corresponding locations in the first DoG image 11 and the second DoG image 21. Here, the reference pixel may be a pixel designated by the user, or a pixel that is located at a center portion of the mask region. The mask region may refer to all pixels included in the mask when the mask is applied to first and second DoG images 11 and 21 (see FIG. 10).

The binary-coded image generator 233 generates a single binary-coded image 40 (see FIG. 11) by representing the reference pixel as a first brightness value when the radio frequency component of the first DoG image 11 is greater than that of the second DoG image 21 and representing the reference pixel as a second brightness value when the radio frequency component of the second DoG image 21 is greater than that of the first DoG image 11.

Figure 12:
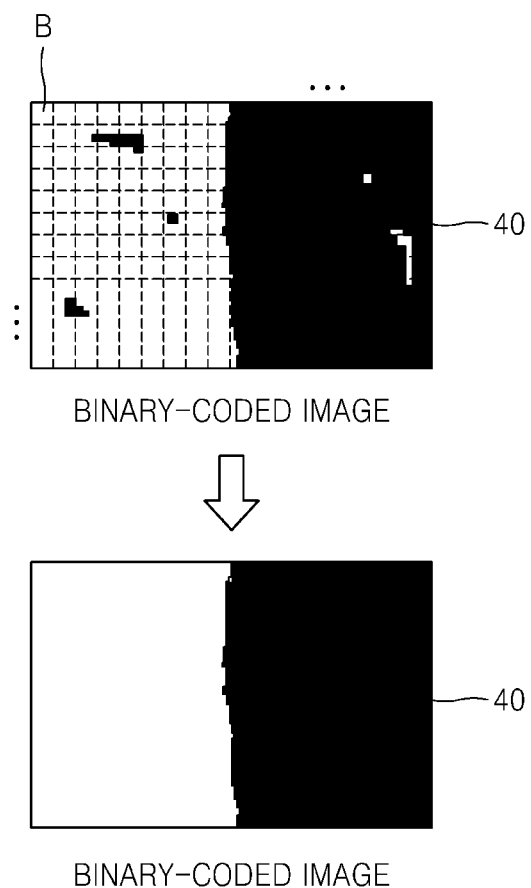
FIG. 12 is a diagram illustrating a process of correcting an error pixel, according to an embodiment.
Figure 13:
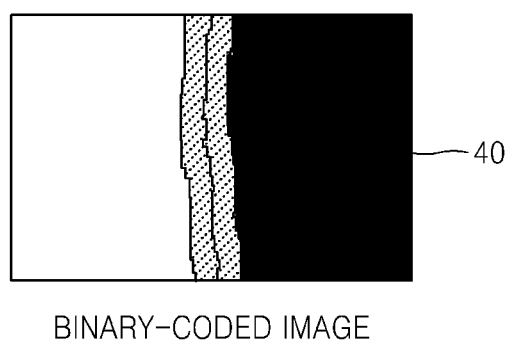
FIG. 13 illustrates a process of setting an unknown region, according to an embodiment.

The first corrector 234 corrects an error pixel included in the generated binary-coded image 40 (see FIG. 12), and the second corrector 235 corrects a boundary between the subject and the background included in the binary-coded image 40, in which the error pixel is corrected by the first corrector 234 (see FIG. 13). In the binary-coded image 40, the subject portion is represented as the first brightness value, and the background portion may be represented as the second brightness value.

FIG. 4 is a detailed block diagram of the first corrector 234 included in the setting unit 230 shown in FIG. 3.

Referring to FIG. 4 and FIG. 12, a division unit 234a divides the binary-coded image 40 into a plurality of blocks. In addition, an error corrector 234b converts brightness values of the pixels having the second brightness value into the first brightness value when there are many pixels having the first brightness value in blocks divided by the division unit 234a, and converts the brightness values of the pixels having the first brightness value into the second brightness value when there are many pixels having the second brightness value in the blocks. That is, the first corrector 234 corrects the error pixel with the result that the brightness value of an isolated pixel is converted into the brightness value of neighboring pixels.

Figure 5:
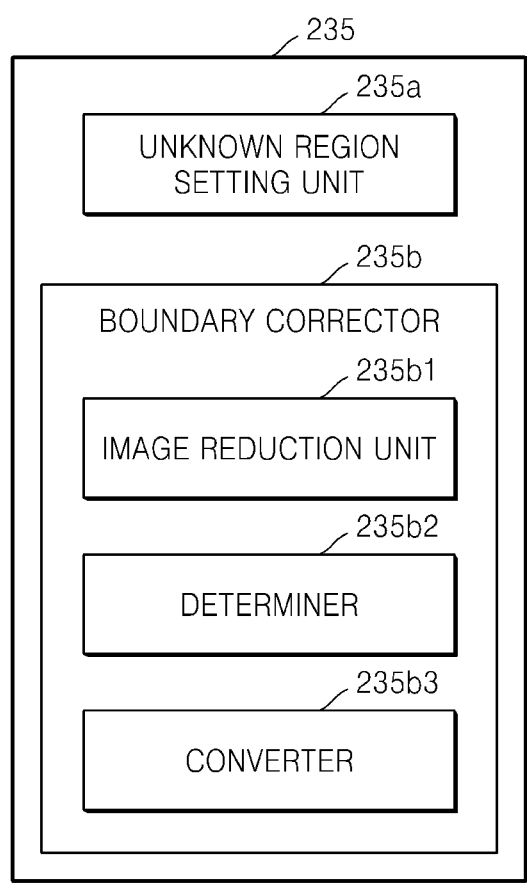
FIG. 5 is a detailed block diagram of a second corrector included in the setting unit of FIG. 3.

FIG. 5 is a detailed block diagram of the second corrector 235 included in the setting unit 230 of FIG. 3.

Referring to FIG. 5 and FIG. 13, an unknown region setting unit 235a sets a boundary and peripheral region between the subject portion and the background portion in the binary-coded image 40 as an unknown region. Here, the boundary denotes an interface between the subject and the background, and the peripheral region denotes some extension of the unknown region from the boundary towards the subject and the background. A boundary corrector 235b gradually reduces the set unknown region by comparing the unknown region with the first image 10. In detail, the boundary corrector 235b includes an image reduction unit 235b1 that reduces the binary-coded image 40 and the first image 10 by the same ratio, a determiner 235b2 that determines whether the pixel included in the unknown region in the binary-coded image 40 corresponds to the subject portion or the background portion, via the brightness value or color information of the pixel located at the same location in the first image 10, and a converter 235b3 that converts the brightness of the pixel into the first brightness value when the pixel included in the unknown region corresponds to the subject portion and converts the brightness of the pixel into the second brightness value when the pixel included in the unknown region corresponds to the background portion.

The out-of-focus image derivation unit 240 included in the DSP 200 of FIG. 2 substitutes the subject portion, with the first brightness value, of the binary-coded image 40 with the corresponding pixels in the first image 10, and substitutes the background portion, with the second brightness value, of the binary-coded image 40 with the corresponding pixels in the third image 30. That is, the out-of-focus image derivation unit 240 combines the subject portion of the binary-coded image 40 with the subject portion of the first image 10, and alpha-blends the background portion of the binary-coded image 40 with the background portion of the third image 30 to combine images. Therefore, the binary-coded image 40 is combined with the other images so that the boundary between the subject and the background in the binary-coded image 40 may be naturally represented.

Figure 6:
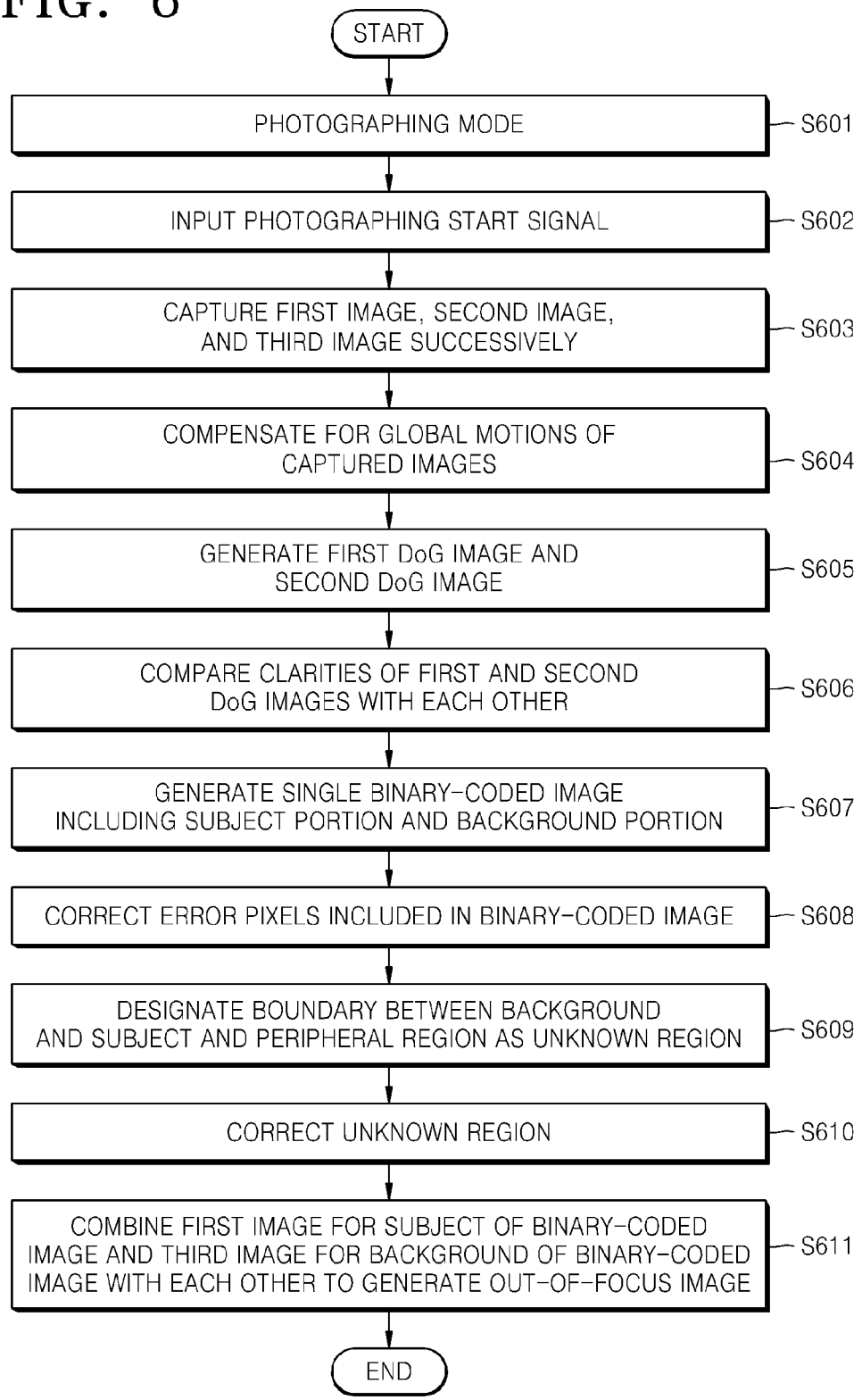
FIG. 6 is a flowchart illustrating an image processing method according to an embodiment.

FIG. 6 is a flowchart illustrating an image processing method according to an embodiment.

The user manipulates the digital camera 100 of FIG. 1 to enter a photographing mode in operation S601.

The user pushes the shutter-release button of the manipulation unit 170 to input the photographing start signal into the DSP 200 in operation S602.

Figure 7:
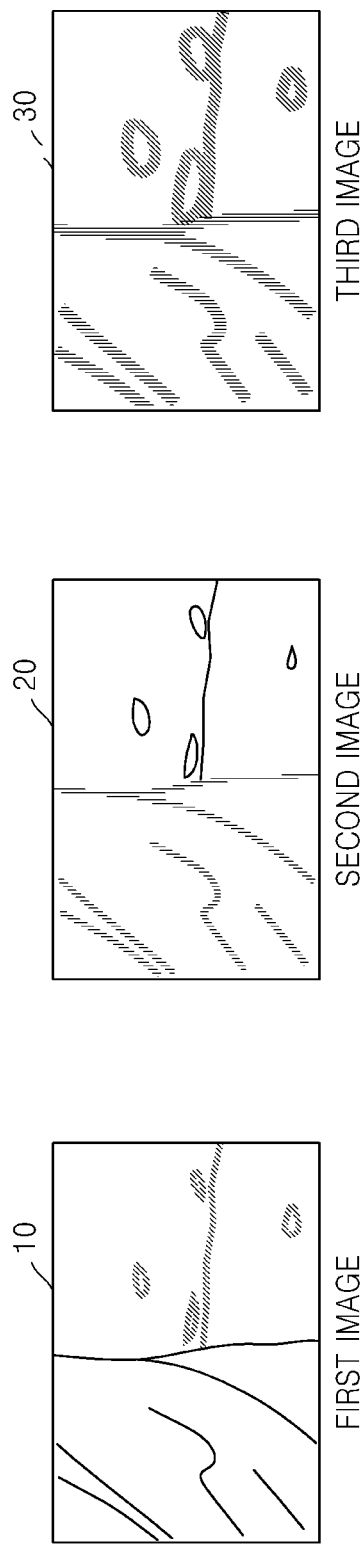
FIG. 7 shows a plurality of images having different focuses from each other, according to an embodiment.

The DSP 200 successively obtains a plurality of images with different focuses according to the single photographing start signal in operation S603. FIG. 7 shows a plurality of images having different focuses from each other, according to the current embodiment. Referring to FIG. 7, the plurality of images may include the first image 10 in which the subject is focused, the second image 20 in which the background is focused, and the third image 30, that is, a super-macro image, that is not focused. The first image 10 is initially obtained, and then the second and third images 20 and 30 may be successively captured next to the first image 10 regardless of a photographing order. The out-of-focus image is an image in which only the subject is focused and the background is blurred (e.g., an image having a shallow depth of field), and thus, other images should be obtained based on the image in which the subject is focused. In addition, since hand shake generally occurs less immediately after pushing the shutter-release button, the first image 10 should be captured initially in order to obtain the image with less hand shake.

The DSP 200 compensates for the global motion of each of the second and third images 20 and 30 based on the first image 10 in operation S604. FIG. 8 illustrates a process of compensating for the global motion of the image according to the current embodiment. As shown in FIG. 8, shifting of all of the pixels of the second and third images 20 and 30 is compensated for based on the first image 10 and the first through third images 10, 20, and 30 are aligned so that the pixels in the first through third images 10, 20, and 30 correspond to each other. Through the above process, the shifting of all of the pixels generated due to the hand shake occurring while the plurality of images are captured may be compensated for. In addition, since the global motion is compensated for, the pixels included in the plurality of images may correspond to each other, and thus, one binary-coded image or an out-of-focus image may be generated by using the plurality of images.

The DSP 200 generates the first DoG image 11 by applying the DoG filter to the first image 10, and generates the second DoG image 21 by applying the DoG filter to the second image 20 in operation S605. FIG. 9 illustrates processes of applying the DoG filter to the images and obtaining results, according to the current embodiment. As shown in FIG. 9, the first and second DoG images 11 and 21 may be obtained by extracting radio frequency components of the first and second images 10 and 20 by using the DoG filter. Since the DoG filter is described in detail with reference to FIG. 3, descriptions of examples and applications of the DoG filter will not be provided here.

Figure 10:
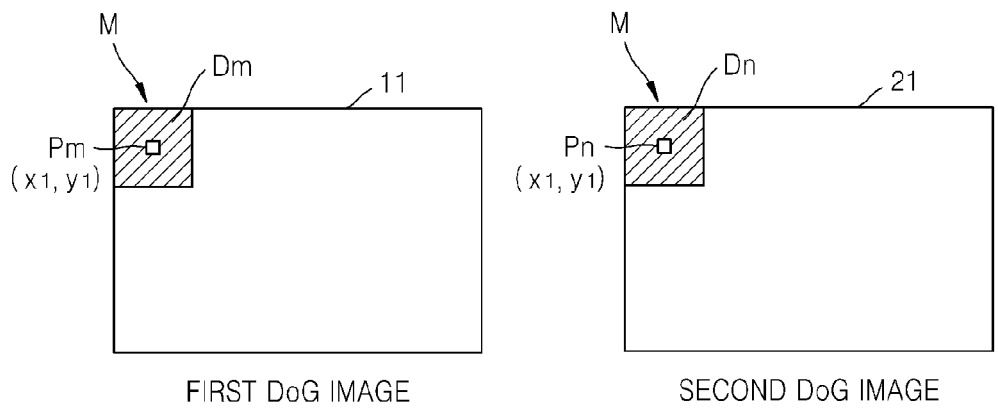
FIG. 10 illustrates a process of comparing radio frequency components of a first DoG image and a second DoG image with each other according to an embodiment.

The DSP 200 compares the radio frequency components of the first DoG image 11 and the second DoG image 21 with each other in operation S606. FIG. 10 illustrates a process of comparing the radio frequency components of the first and second DoG images 11 and 21 with each other according to the current embodiment. Referring to FIG. 10, an 11×11 mask M is applied to the first DoG image 11. A pixel located at a center portion of the mask M becomes a reference pixel Pm. Likewise, an 11×11 mask M is applied to the second DoG image 21. A pixel located at a center portion of the mask M is a reference pixel Pn. Here, the reference pixel Pm of the first DoG image 11 and the reference pixel Pn of the second DoG image 21 are located at corresponding positions, that is, a location (x1, y1) in each of the first and second DoG images 11 and 21. The radio frequency components of 121 pixels including the reference pixel Pn or Pm in the mask region Dm or Dn of the first DoG image 11 or the second DoG image 21 are compared with each other. For example, a pixel $I_{max}$ having the highest brightness and a pixel $I_{min}$ having the lowest brightness are extracted from the above 121 pixels. Next, a difference $D_i$ between the brightnesses of the pixels $I_{max}$ and $I_{min}$ is calculated by using Equation 4. If the difference $D_i$ between the brightness values in the first DoG image 11 is greater than that of the second DoG image 21, it is determined that the radio frequency component of the first DoG image 11 is greater than that of the second DoG image 21. Likewise, if the difference $D_i$ between the brightness values in the second DoG image 21 is greater than that of the first DoG image 11, it is determined that the radio frequency component of the second DoG image 21 is greater than that of the first DoG image 11.

$$D_i = I_{max\ i} - I_{min\ i} \quad (4)$$

In the current embodiment, the 11×11 mask M is used because accuracy of the result of $D_i$ is degraded when the mask is smaller than 11×11 and calculation speed is reduced when the mask is greater than 11×11.

Figure 11:
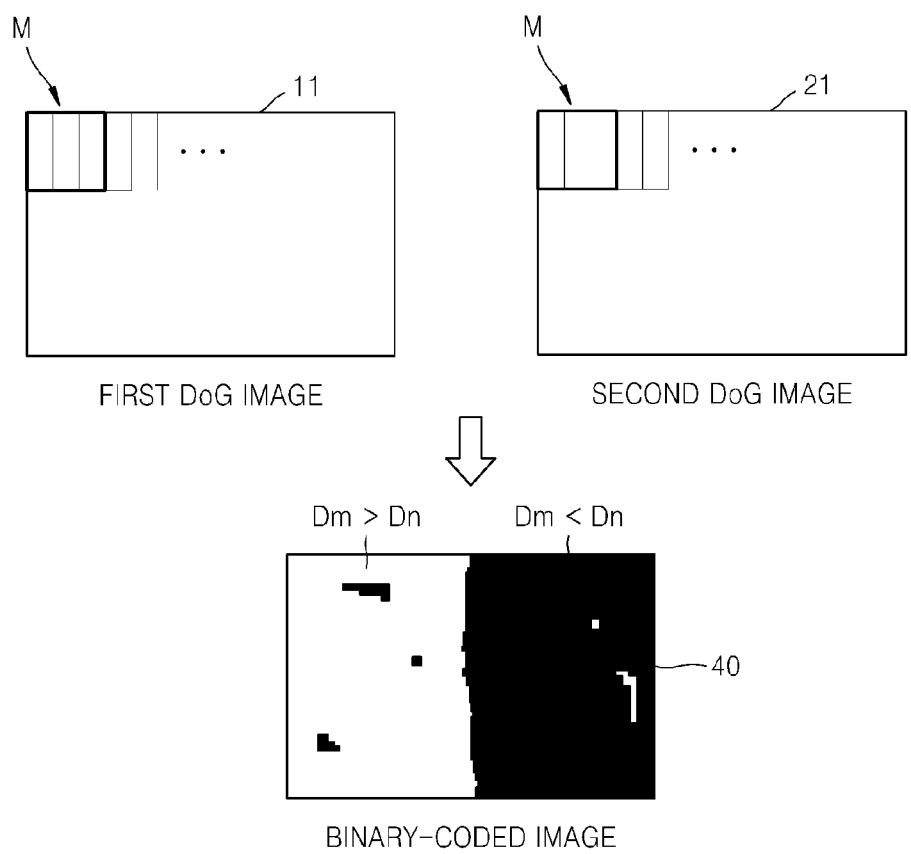
FIG. 11 illustrates a process of generating a binary-coded image, according to an embodiment.

The DSP 200 generates the single binary-coded image 40 through the result of comparing the radio frequency components of the first and second DoG images 11 and 21 with each other in operation S607. FIG. 11 illustrates a process of generating the binary-coded image 40, according to the current embodiment. Referring to FIG. 11, when the radio frequency component of the pixels included in the mask region Dm of the first DoG image 11 is greater than that of the second DoG image 21, the reference pixel Pm is represented as the first brightness value. In addition, when the radio frequency component of the pixels included in the mask region Dn of the second DoG image 21 is greater than that of the first DoG image 11, the reference pixel Pn is represented as the second brightness value. As described above, the process of comparing the radio frequency components of the first and second DoG images 11 and 21 with each other is repeated for all pixels of each of the first and second DoG images 11 and 21 while moving the 11×11 mask M one pixel at a time. As a result, the binary-coded image 40 represented by the first and second brightness values may be obtained. Here, the first brightness value may be a 255 level (white) and the second brightness value may be a 0 level (black). Parts represented by the first brightness value correspond to the subject portion of the first image 10, in which the subject is focused, since the radio frequency component of the first DoG image 11 is greater than that of the second DoG image 21 and the clarity of the first image 10 is greater than that of the second image 20. In addition, parts represented by the second brightness value correspond to the background portion of the second image 20, in which the background is focused, since the radio frequency component of the second DoG image 21 is greater than that of the first DoG image 11 and the clarity of the second image 20 is greater than that of the first image 10.

The DSP 200 corrects error pixels included in the binary-coded image 40 in operation S608. The error pixel is, for example, a pixel that should be represented as the background portion but is represented as the subject portion, or a pixel that should be represented as the subject portion but is represented as the background portion. FIG. 12 is a diagram illustrating a process of correcting the error pixel, according the current embodiment. Referring to FIG. 12, the binary-coded image 40 is divided into a plurality of blocks B. For example, the number of the blocks B may be 32×32. If there are too many blocks B, it takes a large amount of time to correct error pixels, and if the number of blocks B is too small, the boundary between the subject and the background becomes vague. When there are more pixels of the first brightness value than the pixels of the second brightness value in one block B, the pixels of the second brightness value in the one block B are converted to have the first brightness value. When there are more pixels of the second brightness value than the pixels of the first brightness value in one block B, the pixels of the first brightness value in the one block B are converted to have the second brightness value. That is, if there are more pixels of the first brightness value than those of the second brightness value in one block B, it is determined that the block is the subject portion, and the brightness values of the isolated pixels, of the second brightness value, are corrected. Therefore, the binary-coded image 40 in which the error pixels are corrected may be obtained. However, while performing the above processes, at the boundary between the subject portion and the background portion, the block B corresponding to the subject may be undesirably converted as the background or the block B corresponding to the background portion may be undesirably converted as the subject portion. Thus, a process of correcting the boundary between the subject and the background to prevent the above problem is performed.

The DSP 200 sets the boundary between the subject and the background and the peripheral region of the boundary as the unknown region in the binary-coded image 40 in operation S609. FIG. 13 illustrates the process of setting the unknown region, according to the current embodiment. Referring to FIG. 13, the boundary between the subject and the background and the peripheral region in the binary-coded image 40 are set as the unknown region. The unknown region is converted to a third brightness value, which may be a 150 level (gray).

The DSP 200 corrects the unknown region included in the binary-coded image 40 by comparing the binary-coded image with the first image 10 in order to clarify the boundary between the subject and the background in operation S610. FIG. 14 illustrates the process of reducing the unknown region of FIG. 13 and clarifying the boundary between the subject and the background, according to the current embodiment. Referring to FIG. 14, the binary-coded image 40 and the first image 10 are reduced by the same ratio. Here, the binary-coded image 40 and the first image 10 may be respectively reduced by 0.25 times. It is determined whether the pixel included in the unknown region of the reduced binary-coded image 40 corresponds to the subject portion or the background portion by using image information of the pixel included in the reduced first image 10 at the corresponding location as the pixel in the binary-coded image 40. As a result of the determination, if the pixel included in the unknown region corresponds to the subject portion, the pixel is converted to have the first brightness value, and if the pixel included in the unknown region corresponds to the background portion, the pixel is converted to have the second brightness value. That is, each of the pixels in the unknown region is changed into the subject portion or the background portion by comparing the reduced binary-coded image with the reduced first image 10 so as to finally reduce and eliminate the unknown region. Here, the image information of the pixel included in the first image 10 may be the brightness value of the pixel or R (red), G (green), and B (blue) color information of the pixel. The above process of reducing the unknown region is repeatedly performed for the binary-coded image 40 and the first image 10 that are reduced by 0.25 times, the binary-coded image 40 and the first image 10 that are halved, and the binary-coded image 40 and the first image having their original sizes.

Figure 15:
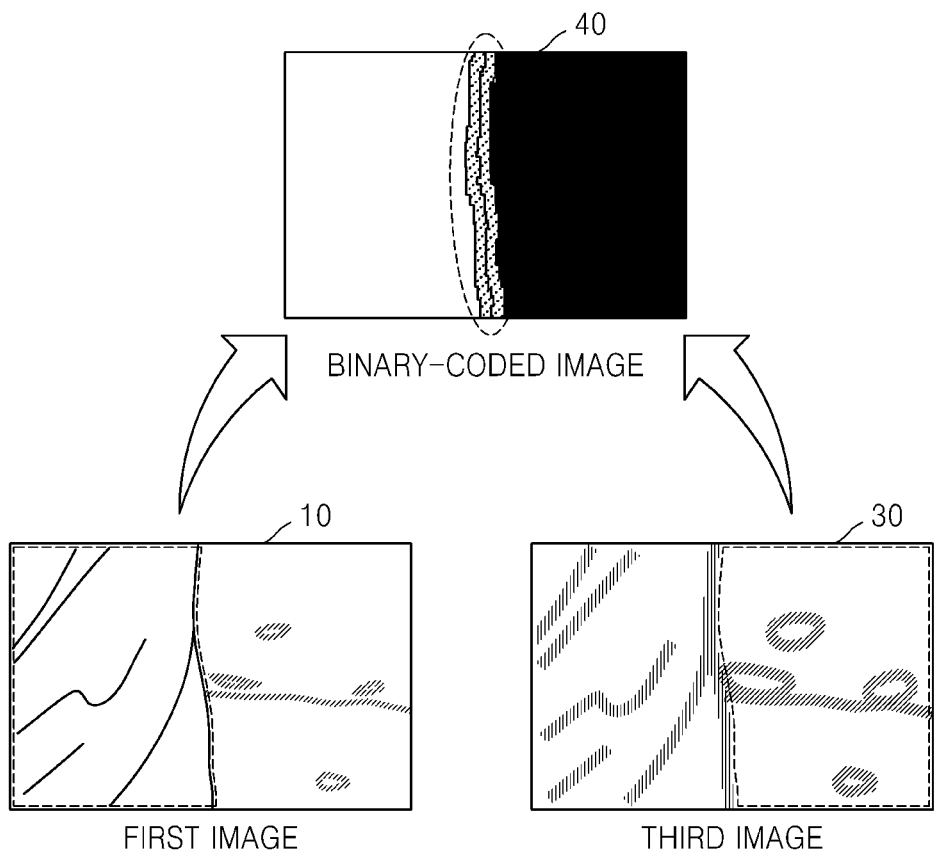
FIG. 15 is illustrates a process of generating an out-of-focus image, according to an embodiment.

The DSP 200 substitutes the subject portion of the binary-coded image 40 with the subject portion of the first image 10, and substitutes the background portion of the binary-coded image 40 with the background portion of the third image 30 to combine images and generate an out-of-focus image in operation S611. FIG. 15 illustrates the process of generating the out-of-focus image, according to the current embodiment. Referring to FIG. 15, a pixel of the first image 10 located at the same position as the pixel included in the subject portion of the binary-coded image 40 substitutes for the subject portion of the binary-coded image 40. In addition, a pixel of the third image 30 located at the same position as the pixel included in the background portion of the binary-coded image 40 substitutes for the background portion of the binary-coded image 40. That is, the subject portion of the first image 10 and the background portion of the third image 30 are combined to generate the out-of-focus image. The first image 10, in which the subject is focused, and the third image 30, which is the super-macro image that is not focused, are combined with each other, and thus, the out-of-focus image desired by the user may be generated. According to the current embodiment, the images may be combined so that the boundary between the background and the subject may be naturally represented by alpha-blending the binary-coded image 40. Here, the alpha blending is a combination method for naturally combining the images by representing the boundary as the intermediate brightness between the brightness levels of the subject and the background.

Figure 16:
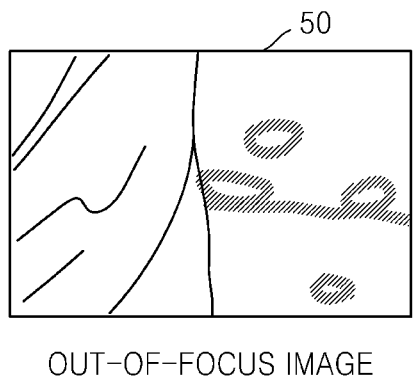
FIG. 16 shows a resultant image obtained by an image processing method, according to an embodiment.

FIG. 16 shows a resultant image obtained by the image processing method, according to an embodiment.

Referring to FIG. 16, according to the image processing method of the current embodiment, an out-of-focus image 50 in which the subject portion is clear and the background is blurred is obtained.

According to various embodiments, owing to a plurality of images having different focuses obtained by AF bracketing photographing, the image for the subject, in which the subject is focused, and the image for the background, which is not focused, are combined with each other to show the out-of-focus effect.

Therefore, according to the embodiments of the present invention, the out-of-focus images may be obtained by using compact digital cameras having a deep DOF, camera phones, PDAs, and personal multimedia players (PMPs) with photographing functions.

According to the embodiments, out-of-focus images may be obtained by using the photographing apparatus, when it is difficult to capture the out-of-focus image due to the deep DOF with respect to the subject.

In addition, other embodiments may also be implemented through computer readable code/instructions which are stored in/on a medium, e.g., a non-transitory computer readable storage medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as electronic or magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion. Furthermore, the processing element could include a processor or a computer processor, and processing elements may be distributed and/or included in a single device.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention. Descriptions of features or aspects within each embodiment should typically be considered as available for other similar features or aspects in other embodiments.

Furthermore, recitation of ranges of values herein are merely intended to serve as a shorthand method of referring individually to each separate value falling within the range, unless otherwise indicated herein, and each separate value is incorporated into the specification as if it were individually recited herein. All references, including publications, patent applications, and patents, cited herein are hereby incorporated by reference to the same extent as if each reference were individually and specifically indicated to be incorporated by reference and were set forth in its entirety herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. An image processing method for obtaining an out-of-focus image by using a plurality of images, the method comprising:

capturing a first image, a second image, and a third image, which are captured with different focuses for the same subject and background, wherein the first image is an image in which the subject is focused, the second image is an image in which the background is focused, and the third image is a super-macro image in which no part of the image is focused;

setting a subject portion and a background portion by using the first and second images, wherein the setting comprises:

generating a first difference of Gaussian (DoG) image and a second DoG image by applying a DoG filter to each of the first and second images;

comparing radio frequency components in mask regions of the first and second DoG images with each other, wherein the mask regions respectively include reference pixels that are located at corresponding positions of the first and second DoG images;

generating a single binary-coded image by representing the reference pixels as a first brightness value when the radio frequency component of the first DoG image is greater than that of the second DoG image, and representing the reference pixels as a second brightness value when the radio frequency component of the second DoG image is greater than that of the first DoG image; and correcting error pixels included in the generated binary-coded image; and combining the first image for the subject portion and the third image for the background portion with each other to obtain an out-of-focus image.

2. The method of claim 1, wherein the first image, the second image, and the third image are captured successively when a single photographing start signal is input.

3. The method of claim 1, further comprising:

compensating for global motions of the second image and the third image based on the first image, after capturing the first, second, and third images.

4. The method of claim 1, wherein pixels represented as the first brightness value are designated in the subject portion and pixels represented as the second brightness value are designated in the background portion, and the method further comprises correcting a boundary between the subject portion and the background portion in the binary-coded image.

5. The method of claim 4, wherein the correcting the boundary between the subject portion and the background portion comprises:

designating the boundary between the subject and the background and a peripheral portion as an unknown region; and reducing the unknown region by comparing the binary-coded image with the first image, and clarifying the boundary.

6. The method of claim 5, wherein reducing the unknown region comprises:

reducing the binary-coded image and the first image at a same reduction ratio;

determining whether a pixel included in the unknown region corresponds to the subject portion or the background portion by using image information of the pixel included in the first image at the corresponding position to the pixel of the unknown region; and converting the pixel in the unknown region into the first brightness value when the pixel corresponds to the subject portion, and converting the pixel in the unknown region into the second brightness value when the pixel corresponds to the background portion, as a result of determination.

7. The method of claim 6, wherein the image information is a brightness value of a pixel or color information of a pixel.

8. The method of claim 6, wherein combining the first image for the subject portion and the third image for the background portion comprises:

substituting each pixel of the subject portion of the binary-coded image with a pixel of the first image at the corresponding position; and substituting each pixel of the background portion of the binary-coded image with a pixel of the third image at the corresponding position.

9. The method of claim 8, wherein the boundary between the subject portion and the background portion is alpha-blended.

10. The method of claim 1, wherein correcting the error pixels comprises:

dividing the binary-coded image into a plurality of blocks; and when there are more pixels of the first brightness value than pixels of the second brightness value in a block, converting the brightness value of the pixels of the second brightness value into the first brightness value, and when there are more pixels of the second brightness value than pixels of the first brightness value in the block, converting the brightness value of the pixels of the first brightness value into the second brightness value.

11. A non-transitory computer readable storage medium having stored thereon a program executable by a processor for performing an image processing method of obtaining an out-of-focus image by using a plurality of images, the method comprising:

capturing a first image, a second image, and a third image, which are captured with different focuses for the same subject and background, wherein the first image is an image in which the subject is focused, the second image is an image in which the background is focused, and the third image is a super-macro image in which no part of the image is focused;

setting a subject portion and a background portion by using the first and second images, wherein the setting comprises:

generating a first difference of Gaussian (DoG) image and a second DoG image by applying a DoG filter to each of the first and second images;

comparing radio frequency components in mask regions of the first and second DoG images with each other, wherein the mask regions respectively include reference pixels that are located at corresponding positions of the first and second DoG images;

generating a single binary-coded image by representing the reference pixels as a first brightness value when the radio frequency component of the first DoG image is greater than that of the second DoG image, and representing the reference pixels as a second brightness value when the radio frequency component of the second DoG image is greater than that of the first DoG image; and correcting error pixels included in the generated binary-coded image; and combining the first image for the subject portion and the third image for the background portion with each other to obtain an out-of-focus image.

12. An image processing apparatus which obtains an out-of-focus image by using a plurality of images, the apparatus comprising:

a photographing controller that controls the apparatus to capture a first image, a second image, and a third image, which are captured with different focuses for the same subject and background, wherein the first image is an image in which the subject is focused, the second image is an image in which the background is focused, and the third image is a super-macro image in which no part of the image is focused;

a setting unit that sets a subject portion and a background portion by using the first and second images, wherein the setting unit comprises:

a DoG image generator that generates a first DoG image and a second DoG image by applying a DoG filter to each of the first and second images;

a comparator that compares radio frequency components in mask regions of the first and second DoG images, which respectively include reference pixels that are located at positions corresponding to each other;

a binary-coded image generator that generates a single binary-coded image by representing the reference pixels as a first brightness value when the radio frequency component of the first DoG image is greater than that of the second DoG image, and representing the reference pixels as a second brightness value when the radio frequency component of the second DoG image is greater than that of the first DoG image; and a first corrector that corrects error pixels included in the binary-coded image; and an out-of-focus image derivation unit that combines the first image for the subject and the third image for the background to generate the out-of-focus image.

13. The apparatus of claim 12, wherein the first image is captured before the second image and the third image.

14. The apparatus of claim 13, further comprising a global motion compensator that compensates for global motion of the second and third images based on the first image.

15. The apparatus of claim 12, wherein the photographing controller controls the apparatus to capture the first image, the second image, and the third image successively when a single photographing start signal is received.

16. The apparatus of claim 12, wherein a pixel represented as the first brightness value is designated in the subject portion and a pixel represented as the second brightness value is designated in the background portion, and the apparatus further comprises a second corrector that corrects a boundary between the subject portion and the background portion in the binary-coded image.

17. The apparatus of claim 16, wherein the second corrector comprises:

an unknown region setting unit that designates the boundary between the subject and the background and a peripheral portion as an unknown region; and a boundary corrector that reduces the unknown region by comparing the binary-coded image with the first image, and clarifies the boundary.

18. The apparatus of claim 17, wherein the boundary corrector comprises:

an image reduction unit that reduces the binary-coded image and the first image by a same reduction ratio;

a determiner that determines whether a pixel included in the unknown region corresponds to the subject portion or the background portion by using image information of the pixel included in the first image at the corresponding position to the pixel of the unknown region; and a converter that, for each pixel in the unknown region, converts the pixel into the first brightness value when the pixel corresponds to the subject portion, and converts the pixel into the second brightness value when the pixel corresponds to the background portion, as a result of the determining.

19. The apparatus of claim 18, wherein the image information is the brightness value of the pixel or color information of the pixel.

20. The apparatus of claim 18, wherein the out-of-focus image derivation unit substitutes each pixel of the subject portion of the binary-coded image with a pixel of the first image at the corresponding position, and substitutes each pixel of the background portion of the binary-coded image with a pixel of the third image at the corresponding position.

21. The apparatus of claim 20, wherein the out-of-focus image derivation unit performs an alpha-blending process on the boundary between the subject portion and the background portion.

22. The apparatus of claim 12, wherein the first corrector comprises:

a division unit that divides the binary-coded image into a plurality of blocks; and an error corrector that, for each of the plurality of blocks, converts the brightness value of the pixels of the second brightness value into the first brightness value when there are more pixels of the first brightness value than pixels of the second brightness value in the block, and that converts the brightness value of the pixels of the first brightness value into the second brightness value when there are more pixels of the second brightness value than pixels of the first brightness value in the block.

* * * * *